(12) United States Patent
Chao et al.

(10) Patent No.: US 7,756,830 B1
(45) Date of Patent: Jul. 13, 2010

(54) ERROR DETECTION PROTOCOL

(75) Inventors: Ching-Yun Chao, Austin, TX (US);
Roger Eldred Hough, Austin, TX (US);
Rodolfo Augusto Mancisidor-Landa,
Austin, TX (US); **Javashree
Ramanathan**, Round Rock, TX (US);
Amal Ahmed Shaheen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,907

(22) Filed: Mar. 31, 1999

(51) Int. Cl.
*G06F 17/30* (2006.01)

(52) U.S. Cl. .................... 707/638; 707/640; 707/652

(58) Field of Classification Search ............. 707/2, 707/9–10, 102, 202, 203; 714/1, 45, 48, 714/54; 709/221
See application file for complete search history.

(56) References Cited

U.S. PATENT DOCUMENTS

| | | | |
|---|---|---|---|
| 4,432,057 A | 2/1984 | Daniell et al. |
| 4,620,276 A | 10/1986 | Daniell et al. |
| 5,247,673 A | 9/1993 | Costa et al. |
| 5,261,094 A | 11/1993 | Everson et al. |
| 5,274,789 A | 12/1993 | Costa et al. |
| 5,434,994 A | 7/1995 | Shaheen et al. |
| 5,471,631 A | 11/1995 | Beardsley et al. |
| 5,581,754 A | 12/1996 | Terry et al. |
| 5,603,026 A | 2/1997 | Demers et al. |
| 5,613,079 A | 3/1997 | Debique et al. |
| 5,649,195 A | 7/1997 | Scott et al. |

(Continued)

OTHER PUBLICATIONS

IBM Corp.; Technical Disclosure Bulletin—Replication and Recovery of Database State Information in Fault Tolerant Clusters; Oct. 1993; 4 pages.

(Continued)

*Primary Examiner*—Jean B Fleurantin
(74) *Attorney, Agent, or Firm*—Yee & Associates, P.C.; Jeffrey S. LaBaw

(57) ABSTRACT

A method and apparatus for providing a recent set of replicas for a cluster data resource within a cluster having a plurality of nodes. Each of the nodes having a group services client with membership and voting services. The method of the present invention concerns broadcasting a data resource open request to the nodes of the cluster, determining a recent replica of the cluster data resource among the nodes, and distributing the recent replica to the nodes of the cluster. The apparatus of the present invention is for providing a recent set of replicas for a cluster data resource. The apparatus has a cluster having a plurality of nodes in a peer relationship, each node has an electronic memory for storing a local replica of the cluster data resource. A group services client, which is executable by each node of the cluster, has cluster broadcasting and cluster voting capability. A database conflict resolution protocol ("DCRP"), which is executable by each node of the cluster, interacts with the group services clients such that the DCRP broadcasts to the nodes a data resource modification request having a data resource identifier and a timestamp. The DCRP determines a recent replica of the cluster data resource among the nodes with respect to the timestamp of the broadcast data resource modification request relative to a local timestamp associated with the data resource identifier, and distributes the recent replica of the cluster data resource to each node of the plurality of nodes.

25 Claims, 6 Drawing Sheets

U.S. PATENT DOCUMENTS

| | | | |
|---|---|---|---|
| 5,671,407 A | 9/1997 | Demers et al. | |
| 5,675,802 A | 10/1997 | Allen et al. | |
| 5,724,556 A | 3/1998 | Souder et al. | |
| 5,737,601 A * | 4/1998 | Jain et al. | 707/201 |
| 5,771,354 A | 6/1998 | Crawford | |
| 5,787,262 A | 7/1998 | Shakib et al. | |
| 5,796,999 A | 8/1998 | Azagury et al. | |
| 5,956,489 A * | 9/1999 | San Andres et al. | 709/221 |
| 5,964,886 A | 10/1999 | Slaughter et al. | |
| 5,996,075 A | 11/1999 | Matena | |
| 6,014,669 A | 1/2000 | Slaughter et al. | |
| 6,052,718 A | 4/2000 | Gifford | |
| 6,151,684 A | 11/2000 | Alexander et al. | |
| 6,151,688 A | 11/2000 | Wipfel et al. | |
| 6,161,191 A | 12/2000 | Slaughter et al. | |
| 6,163,855 A | 12/2000 | Shrivastava et al. | |
| 6,173,413 B1 | 1/2001 | Slaughter et al. | |
| 6,189,111 B1 | 2/2001 | Alexander et al. | |
| 6,192,417 B1 | 2/2001 | Block et al. | |
| 6,230,183 B1 | 5/2001 | Yocom et al. | |
| 6,243,825 B1 | 6/2001 | Matena | |
| 6,360,331 B2 | 3/2002 | Vert et al. | |
| 6,393,485 B1 | 5/2002 | Chao et al. | |
| 6,401,120 B1 | 6/2002 | Gamache et al. | |
| 6,587,860 B1 | 7/2003 | Chandra et al. | |
| 6,748,381 B1 | 6/2004 | Chao et al. | |

OTHER PUBLICATIONS

IBM Corp.; Technical Disclosure Bulletin—Bounding Journal Back-Off during Recovery of Data Base Replica in Fault-Tolerant Clusters; Nov. 1993; 4 pages.

IBM Corp.; Technical Disclosure Bulletin—Shared Memory Cluster—A Scalable Multiprocessor Design; Jun. 1994; 5 pages.

* cited by examiner

ERROR DETECTION PROTOCOL

CROSS REFERENCE TO RELATED APPLICATIONS

The present invention is related to the following co-pending patent applications:

U.S. patent application Ser. No. 09/282,225 entitled "Apparatus and Method for Tracking Access to Data Resources in a Cluster Environment"; and U.S. patent application Ser. No. 09/282,908 entitled "Apparatus and Method for Maintaining Consistency of Shared Data Resources in a Cluster Environment";

which are hereby incorporated by reference herein.

TECHNICAL FIELD

The present invention relates generally to distributed networks, and in particular to core cluster functions for maintaining consistency of shared data resources in a cluster environment.

BACKGROUND INFORMATION

As computer systems and networks become increasingly complex, the need to have high availability of these systems is becoming correspondingly important. Data networks, and especially the Internet, are uniting the world into a single global marketplace that never closes. Employees, sales representatives, and suppliers in far-flung regions need access to enterprise network systems every hour of the day. Furthermore, increasingly sophisticated customers expect twenty-four hour sales and service from a Web site.

As a result, tremendous competitive pressure is placed on companies to keep their systems running continuously, and to be continuously available. With inordinate amounts of downtime, customers would likely take their business elsewhere, costing a company their goodwill and a revenue loss. Furthermore, there are costs associated with lost employee productivity, diverted, canceled, and deferred customer orders, and lost market share. In sum, network server outages can potentially cost big money.

In the past, companies have operated with a handful of computers executing relatively simple software. This made it easier to manage the systems and isolate problems.

But in the present networked computing environment, information systems can contain hundreds of interdependent servers and applications. Any failure in one of these components can cause a cascade of failures that could bring down a server and leave a user susceptible to monetary losses.

Generally, there are several levels of availability. The particular use of a software application typically dictates the level of availability needed. There are four general levels of systems availability: base-availability systems, high-availability systems, continuous-operations environments, and continuous-availability environments.

Base-availability systems are ready for immediate use, but will experience both planned and unplanned outages. Such systems are used for application development.

High-availability systems include technologies that significantly reduce the number and duration of unplanned outages. Planned outages still occur, but the servers also includes facilities that reduce their impact. As an example, high-availability systems are used by stock trading applications.

Continuous-operations environments use special technologies to ensure that there are no planned outages for upgrades, backups, or other maintenance activities. Frequently, companies also use high-availability servers in these environments to reduce unplanned outages. Continuous-operations environments are used for Internet applications, such as Internet servers and e-mail applications.

Continuous-availability environments seek to ensure that there are no planned or unplanned outages. To achieve this level of availability, companies must use dual servers or clusters of redundant servers in which one server automatically takes over if another server goes down. Continuous-availability environments are used in commerce and mission critical applications.

As network computing is being integrated more into the present commercial environment, the importance of having high availability for distributed systems on clusters of computer processors has been realized, especially for enterprises that run mission-critical applications. Networks with high availability characteristics have procedures within the cluster to deal with failures in the service groups, and make provisions for the failures. High availability means a computing configuration that recovers from failures and provides a better level of protection against system downtime than standard hardware and software alone.

Conventionally, the strategy for handling failures is through a failfast or failstop function. A computer module executed on a computer cluster is said to be failfast if it stops execution as soon as it detects a severe enough failure and if it has a small error latency. Such a strategy reduces the possibility of cascaded failures due to a single failure occurrence.

Another strategy for handling system failures is through fault containment. Fault containment endeavors to place barriers between components so that an error or fault in one component would not cause a failure in another.

With respect to clusters, an increased need for high availability of ever increasing clusters is required. But growth in the size of these clusters increases the risk of failure within the cluster from many sources, such as hardware failures, program failures, resource exhaustion, operator or end-user errors, or any combination of these.

Up to now, high availability has been limited to hardware recovery in a cluster having only a handful of nodes. But hardware techniques are not enough to ensure that high availability hardware recovery can compensate only for hardware failures, which accounts for only a fraction of the availability risk factors.

An example for providing high availability has been with software applications clustering support. This technique has implemented software techniques for shared system resources such as a shared disk and a communication protocol.

Another example for providing high availability has been with network systems clustering support. With systems clustering support, failover is initiated in the case of hardware failures such as the failure of a node or a network adapter.

Generally, a need exists for simplified and local management of shared resources such as databases, in which local copies of the resource is maintained at each member node of the cluster. Such efficient administrative functions aids the availability of the cluster and allows processor resources to be used for the execution and operation of software applications for a user.

SUMMARY OF THE INVENTION

Thus, provided herein is a method and apparatus for providing a recent set of replicas for a cluster data resource within a cluster having a plurality of nodes. Each of the nodes having a group services client with membership and voting services. The method of the present invention concerns broadcasting a data resource open request to the nodes of the cluster, determining the most recent replica of the cluster data resource among the nodes, and distributing the recent replica to the nodes of the cluster.

The apparatus of the present invention is for providing a recent set of replicas for a cluster data resource. The apparatus has a cluster having a plurality of nodes in a peer relationship, each node has an electronic memory for storing a local replica of the cluster data resource. A group services client, which is executable by each node of the cluster, has cluster broadcasting and cluster voting capability. A database conflict resolution protocol ("DCRP"), which is executable by each node of the cluster, interacts with the group services clients such that the DCRP broadcasts to the plurality of nodes a data resource modification request having a data resource identifier and a timestamp. The DCRP determines a recent replica of the cluster data resource among the nodes with respect to the timestamp of the broadcast data resource modification request relative to a local timestamp associated with the data resource identifier, and distributes the recent replica of the cluster data resource to each required node of the plurality of nodes.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
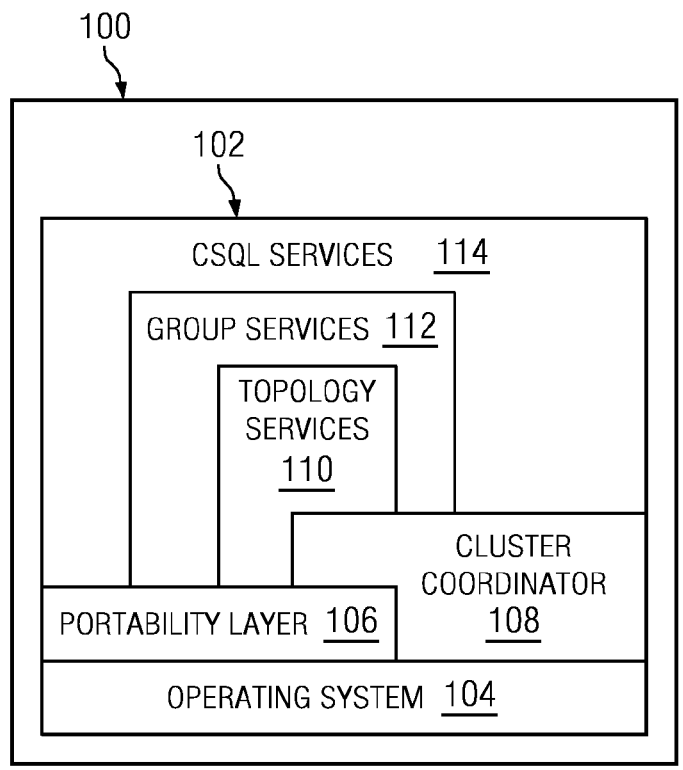
FIG. 1 is a block diagram representation of a computer used for providing a node in the cluster of the present invention.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

Although the present invention is described with reference to a specific embodiment for a technique to provide an aspect of high-availability to a cluster, it should be understood that the present invention can be adapted for use with other high-availability techniques. All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

An aspect of high availability concerns error detection. The most common error is the single error, which is defined as a cluster node having a computational result that is different from the computational result of other cluster nodes.

Referring to FIG. 1, shown is a block diagram representation of a computer 100 used for providing a cluster of the present invention. The computer 100 has suitable hardware and operating system capabilities for providing networking capabilities for communication between different computers, or nodes, in a cluster 200 (see FIG. 2). Each computer 100 used in the cluster has an executable core cluster software services component 102. The core cluster services software component 102 is a middle-ware layer having a set of executables and libraries that run on the resident operating system 104. The core cluster services is 32-bit and SMP (symmetric multiprocessor) ready. The core cluster services software component 102 has sub-components that include a portability layer 106, a cluster coordinator 108, topology services 110, group services 112, and a Cluster Search Query Language ("CSQL") services 114.

The portability layer 106 provides a set of common functions used by the other components to access the resident operating system 104 while also masking operating system-dependent implementations, and functions relating to Reliability-Availability-Serviceability ("RAS") facilities such as tracing and logging of computer operations. The portability layer 106 in effect encapsulates operating-system dependent interfaces. Accordingly, the remaining sub-components of the core cluster services software component 102 may interact with the operating system 104 without having to be structured to interact with the particulars of that operating system 104.

The cluster coordinator sub-component 108 provides software facilities for start-up, stop, and restart of the core cluster services 102. Each computer in the cluster 200 has a cluster coordinator, but the individual cluster coordinators do not communicate with each other; the scope of each cluster coordinator sub-component 108 is restricted to the computer 100 on which it runs. The cluster coordinator sub-component 108 is executed first, and then it brings up the other core cluster services sub-components. Also, the cluster coordinator sub-component 108 monitors each of the other services, and restarts the core cluster services component 102 in the event of a failure.

The topology services sub-component 110 exchanges heartbeat messages with topology services in other computers. Heartbeat messages are used to determine which nodes of a cluster 200 are active and running. Each node of a cluster 200 checks the heartbeat of its neighbor node. Through knowledge of the configuration of the cluster 200 and alternate paths, the topology services sub-component 110 can determine if the loss of a heartbeat represents an adapter failure or a node failure. The topology services sub-component 110 maintains information about which nodes are reachable from other nodes, and this information is used to build a reliable messaging facility.

The group services sub-component, or client, 112 allows the formation of process groups containing processes on the same or different machines in the cluster 200. A process can join a group as a provider or a subscriber. Providers participate in protocol action on the group while subscribers are notified on changes to the state of the group or membership in the group. The group services client 112 supports notification on joins and departures of processes to a process group. The group services client 112 also supports a host group that can be subscribed to in order to obtain the status of all the nodes in the cluster. This status is a consistent view of the node status information maintained by the topology services sub-component 110.

With respect to the present invention, the group services client 112 provides cluster-aware functions to handle failure and reintegration of members in a process group.

These functions are built on top of the reliable messaging facility being either atomic broadcast, or n-phase commit protocols.

The CSQL services sub-component 114 provides support for databases, which may contain configuration and status information. The CSQL services sub-component 114 can operate in stand-alone or cluster mode. The database of the CSQL services sub-component 114 is a distributed resource which, through the use of the group services client 112, is guaranteed to be coherent and highly available. Each database is replicated across all nodes and check pointed to disk so that changes are retained across reboots of the core cluster services 102. The CSQL services sub-component 114 serves or provides each cluster node with an identical copy of data.

Figure 2:
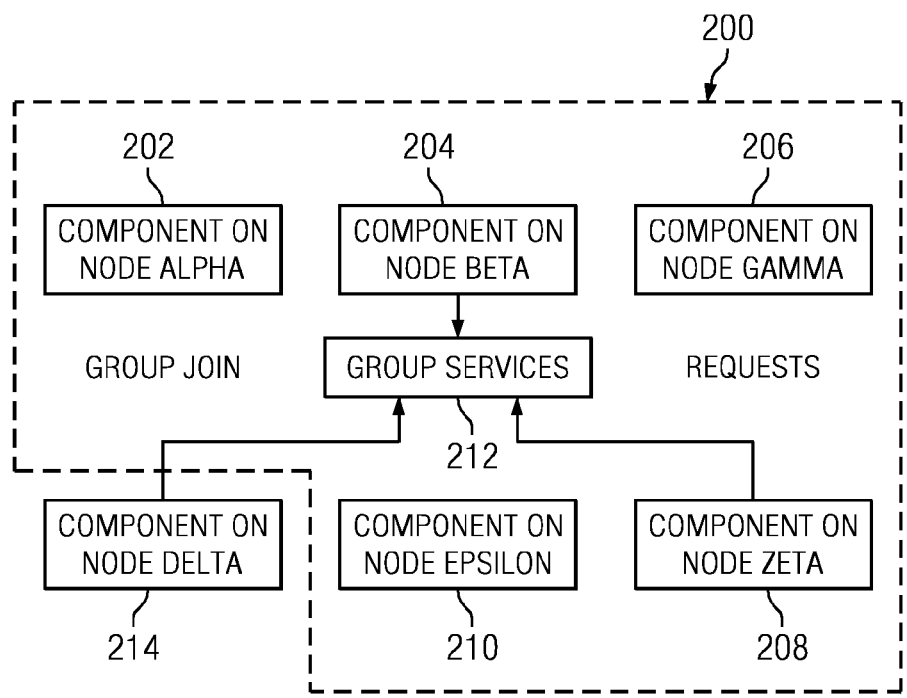
FIG. 2 is a block diagram representing a cluster having a plurality of nodes.

Referring to FIG. 2, shown is a block diagram representing a cluster 200. As an example, the cluster 200 represents an application with components operating on several nodes within the cluster 200. As shown, the cluster 200 has cluster nodes 202, 204, 206, 208, and 210 each executing a component of a software application. Each of the nodes is understood to be provided by a computer 100 as described in detail with respect to FIG. 1. Furthermore, each of the nodes 202, 204, 206, 208, and 210, are members of the cluster 200 because each have a group services client application 112, which collectively provide the group services 212 for the cluster 200.

The members are coordinated by the group services 212. Each of the cluster nodes 202, 204, 206, 208, and 210 have a core cluster services software component 102 with a group services client 112 (see FIG. 1), and each of these nodes are peers with respect to each other.

The group services 212 is formed by the combination of the group services sub-component 112 of the cluster nodes 202, 204, 206, 208, and 210. The term "client" as used herein means, on a network, a computer that accesses shared network resources provided by another computer.

The group services 212 can also support entities known as subscribers. These are cluster nodes that do not directly participate with the group members in planning and executing recovery actions, but are interested in recovery actions taken by the group members.

Accordingly, the group services 212 of the present invention provides updates that are real-time representations that are stored as a replica or copy on each of the cluster nodes 202, 204, 206, 208, 210. The group services 212 also provides cooperative processes to coordinate the maintenance and recovery activities across the cluster 200. An example of an addition of a member or subscriber is shown in FIG. 2, where an application component on node 214 seeks to become a member of the cluster node 200.

The inclusion of a node with respect to the present invention is a function of the shared resources of the cluster 200. For example, if the node 214 either lacks a data resource, such as a database, common to the other nodes of the cluster 200, or has an outdated database, the group services 212 coordinates the installation of a copy of the shared database.

Cluster functions are provided under an n-phase protocol. The n-phase protocol has a set of available votes, which for the present invention is the voting set of {CONTINUE, APPROVE, REJECT}. Each of the nodes participating in the cluster broadcasts a message having a header containing a VOTE field to convey the respective votes of the cluster nodes 202, 204, 206, 208, and 210, and membership seeking node 214. Such messaging formats are known to those skilled in the art. An n-phase refers to the n-series of broadcast/vote sequences generated by the members, or providers, of the cluster 200 to arrive at a consensus with respect to a proposed request.

Figure 3A:
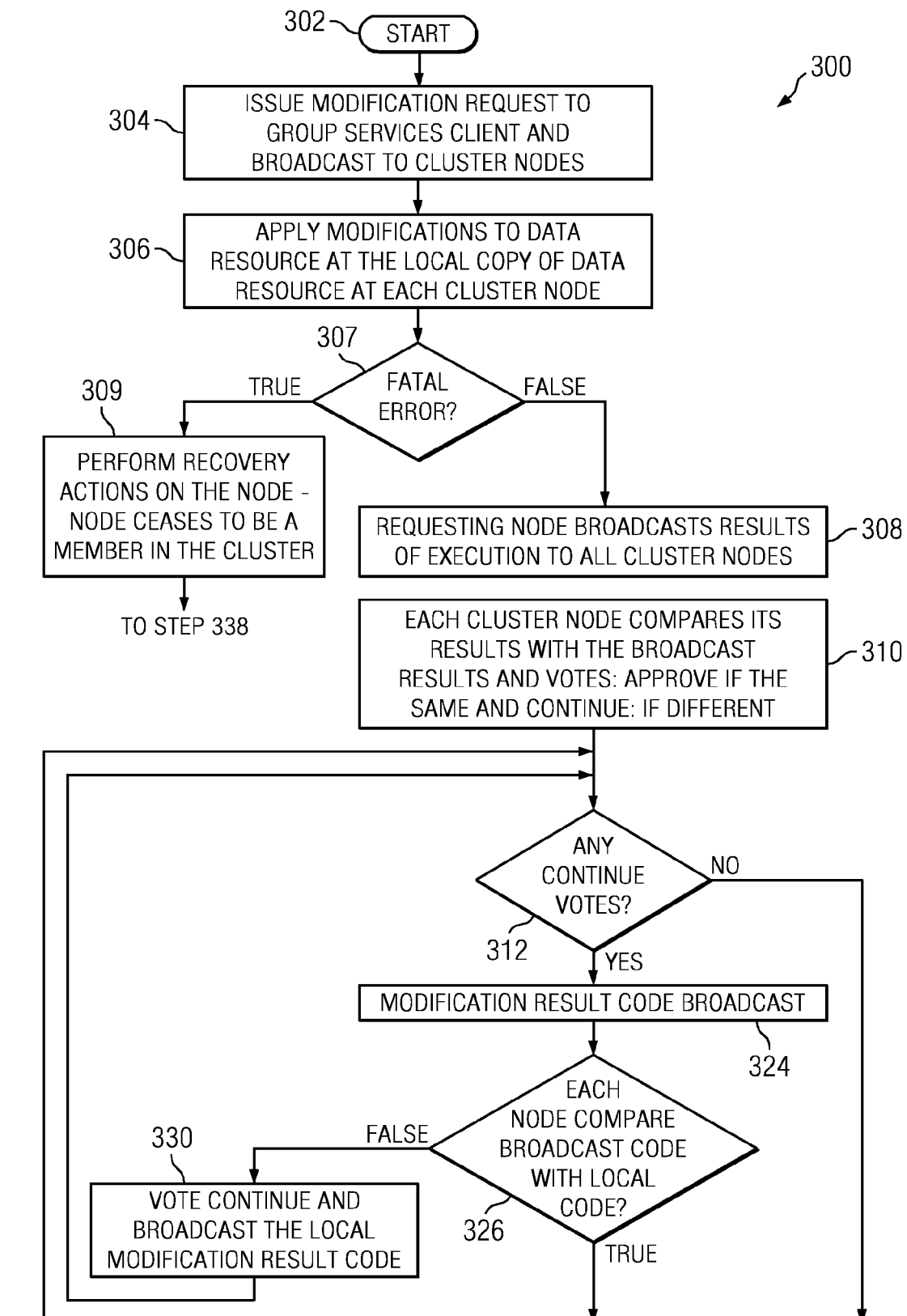
FIG. 3 is a flow chart of error detection protocol executed by the cluster.
Figures 3, 3A, 3B:
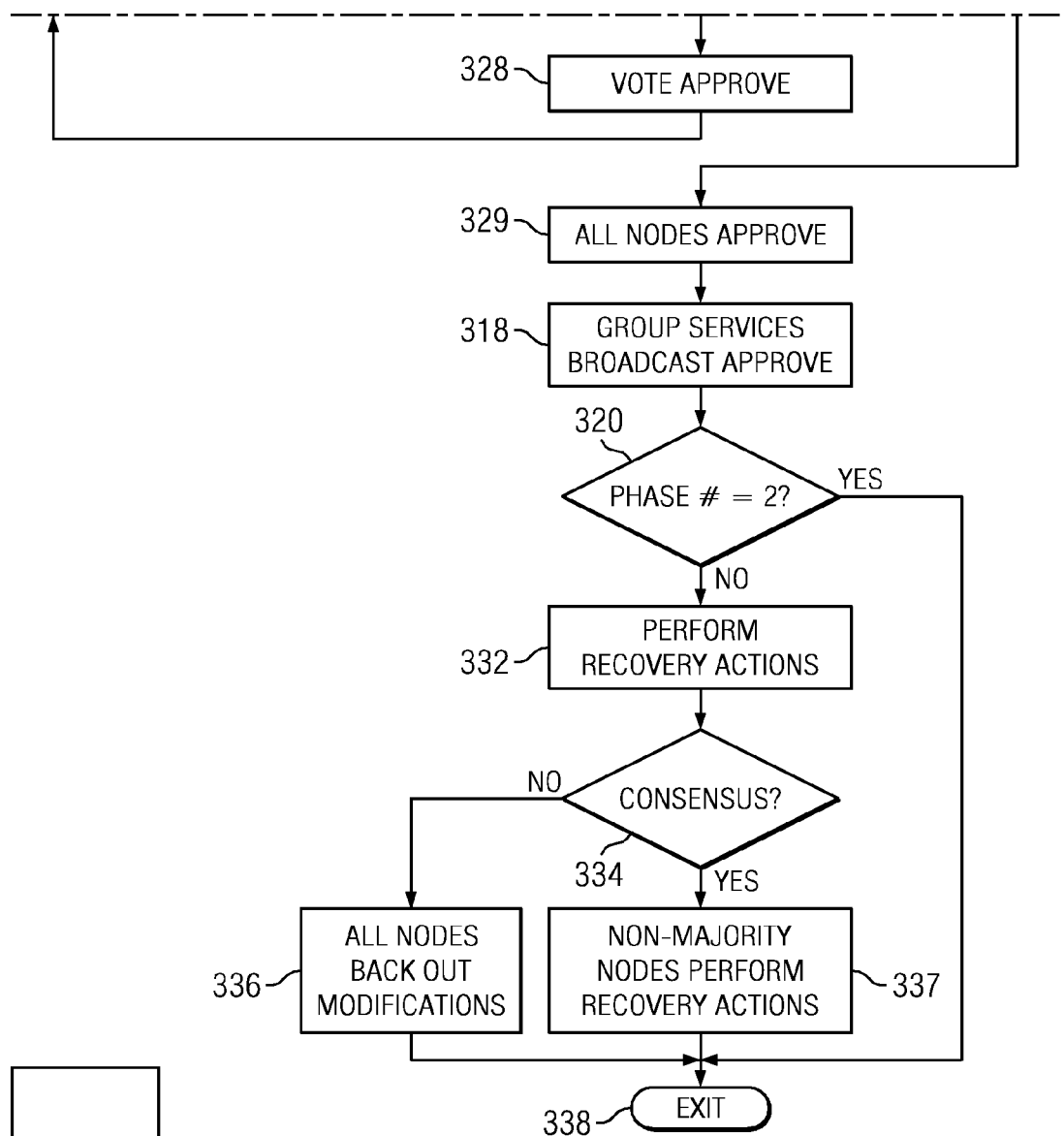

FIG. 3 illustrates a flow chart of error detection protocol ("EDP") 300 executed by the cluster 200. As necessary, reference is made to FIGS. 1 and 2.

The occurrence of the EDP 300 concerns the error of a cluster node in performing a data operation. The flow chart is an example of such an error detection with respect to the modification of a data resource, such as a database, data array, or other form of data structure.

Error detection contributes to the high availability of network resources across the cluster 200 in that detection allows an appropriate error handling routine to be executed to remedy the error, and to maintain data resource integrity for the network as a whole. It should be noted, however, that the aspect of the present invention discussed in detail is with reference to error detection and possible recovery action. For clarity and simplicity, a node having an error is removed from membership in the cluster 200 (see FIG. 2).

Entering the EDP 300 at step 302, a data resource modification request is issued to the group services client 212 by a cluster node 202, 204, 206, 208, 210, or 214, accordingly, at step 304. An example of a data resource modification request is an update request. The modification request is broadcast by the group services client 212 to the cluster nodes 202, 204, 206, 208, 210, and 214.

In the next step 306, the data resource is modified as requested at each of the local copies of the resource for each of the cluster nodes 202, 204, 206, 208, 210, and 214, accordingly. After the local copies of the data resource are modified, each cluster node issues a modification-result code, which is initially stored locally. A modification-result code indicates either a successful completion occurred or an error occurred. It also contains a detailed error message, which is used by all nodes to compare the result of the operation at different nodes.

After each client node executes the request data source modification, then at step 307, each node checks if the result was a fatal error (for example: out of memory or out of paging space). If such an error occurred, then at step 309 the node starts its recovery actions. A typical recovery action in this case would be to shut down and restart the node.

If no fatal error has occurred, then at step 308, the requesting node issues the modification-result code, which is sent to the group services client 212 that broadcasts the result to the nodes of the cluster 200.

Each node of the cluster 200 then compares the broadcast result with a local modification-result code and votes accordingly. The vote set available with respect to the comparison is {APPROVE, CONTINUE}. An APPROVE vote indicates that the comparison result is TRUE, or that there is no difference between the broadcast result and the local modification-result code. A CONTINUE vote indicates that there is a difference between the broadcast result and the local modification-result code.

In step 312, a query is made to determine whether any of the nodes of the cluster 200 issued a CONTINUE vote. If no CONTINUE votes were issued, then at step 329, all the nodes of the cluster 200 issued an APPROVE vote. It should be noted that the phase count is typically incremented in the ordinary course of duties of the group services 212, and is discussed to illustrate the function of the EDP 300. Because an APPROVE vote was reached by all the nodes of the cluster 200 (see FIG. 2) in one phase, the Group Services client 112 then broadcasts APPROVE to the cluster nodes in step 318, indicating successful completion across the cluster 200.

No error occurred across the cluster 200 with respect to execution of the modification request made at step 304. An example of this conclusion is discussed in detail later with respect to FIG. 4. The exit is executed at step 338.

The term "phase" as used herein means the a broadcast/vote sequence where the group services client 212 issues a broadcast action, and the nodes of the cluster 200 issue a vote action.

Referring again to FIG. 3, if there is a CONTINUE vote at step 312, it means that one or more nodes in the cluster 200 had a modification result code that did not match that of the requested node. The purpose of the remaining steps in FIG. 3 is that such results are visible to all nodes in the cluster 200 depending on the number of nodes that have different results, and a recovery action is taken.

In step 324, the cluster nodes that voted "CONTINUE" in the previous phase will broadcast their modification_result code to all the cluster nodes. If there is more than one such message, group services will choose one of them and broadcast. At step 326, each node that voted CONTINUE in the previous phase will compare its modification_result code with that it received. If the same, at step 328 it will vote "APPROVE" and listen for the next phase. If false, it will rebroadcast its modification_result code and vote "CONTINUE" at step 330. This loop will terminate when all the results are visible to all nodes.

Group services 112 automatically increments the phase number each time there is a broadcast/vote cycle. The phase number is checked in step 320. If the phase number is 2, this indicates there was no error and the process exits at step 338. If false, the recovery actions are executed in step 332. At step 334, a check is made if there is consensus. If not, the modifications are backed out in step 336. If there is consensus, some actions may still be needed. The algorithm for achieving consensus adopted here is that a majority of the nodes (n/2+1) have the same results. At step 337, the nodes that have different results from the majority will back out its updates and closes the data resource. A re-open of the data resource will result in an up-to-date version of the data resource to be transmitted to these nodes.

The EDP 300, whether a sole error has or has not occurred, exits at step 338. After the exit step 338, additional cluster activities can be conducted. It should be noted, however, that the EDP 300 can be a multitask protocol or can be a devoted protocol. That is, the EDP 300 can be executed while other processes are executing on the cluster 200 or on individual nodes.

Figure 5:
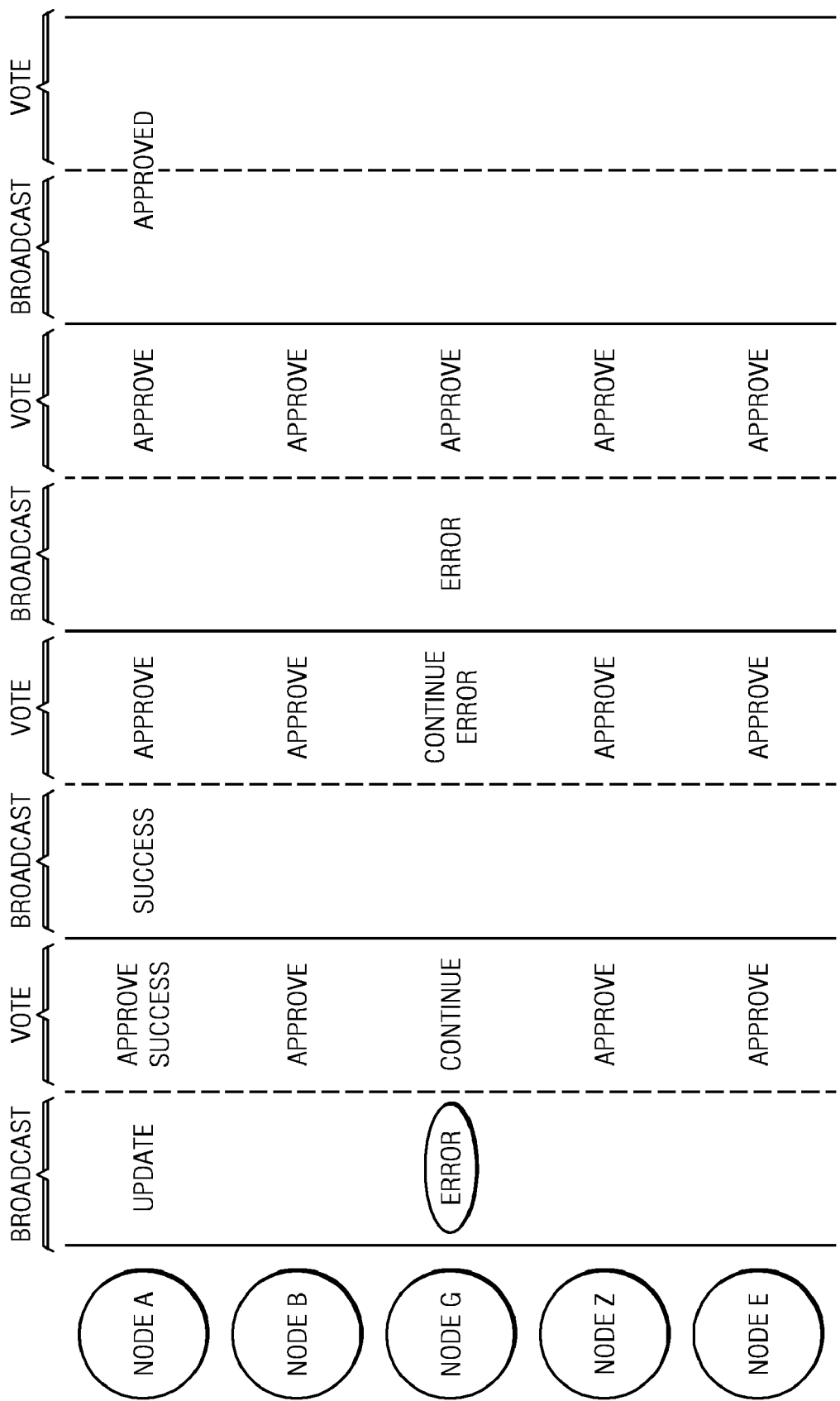
FIG. 5 is an example of an error occurring on a non-requesting node.
Figure 6:
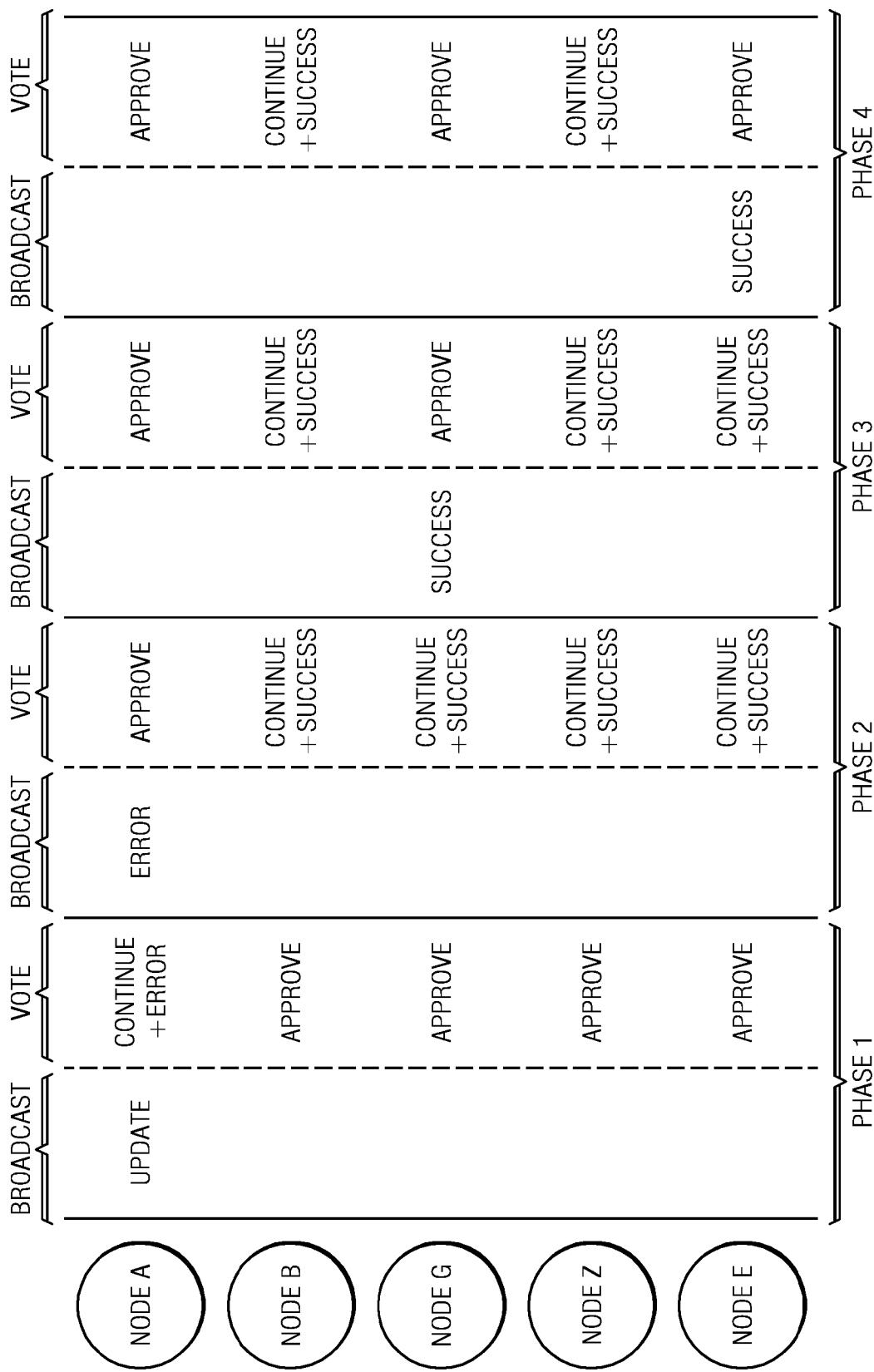
FIG. 6 is another example of an error occurring.

To summarize, three error conditions may exist within the cluster 200: no error occurs (see FIG. 4); an error occurs on a non-requesting node (see FIG. 5); and an error occurs on the requesting node (see FIG. 6).

Figure 4:
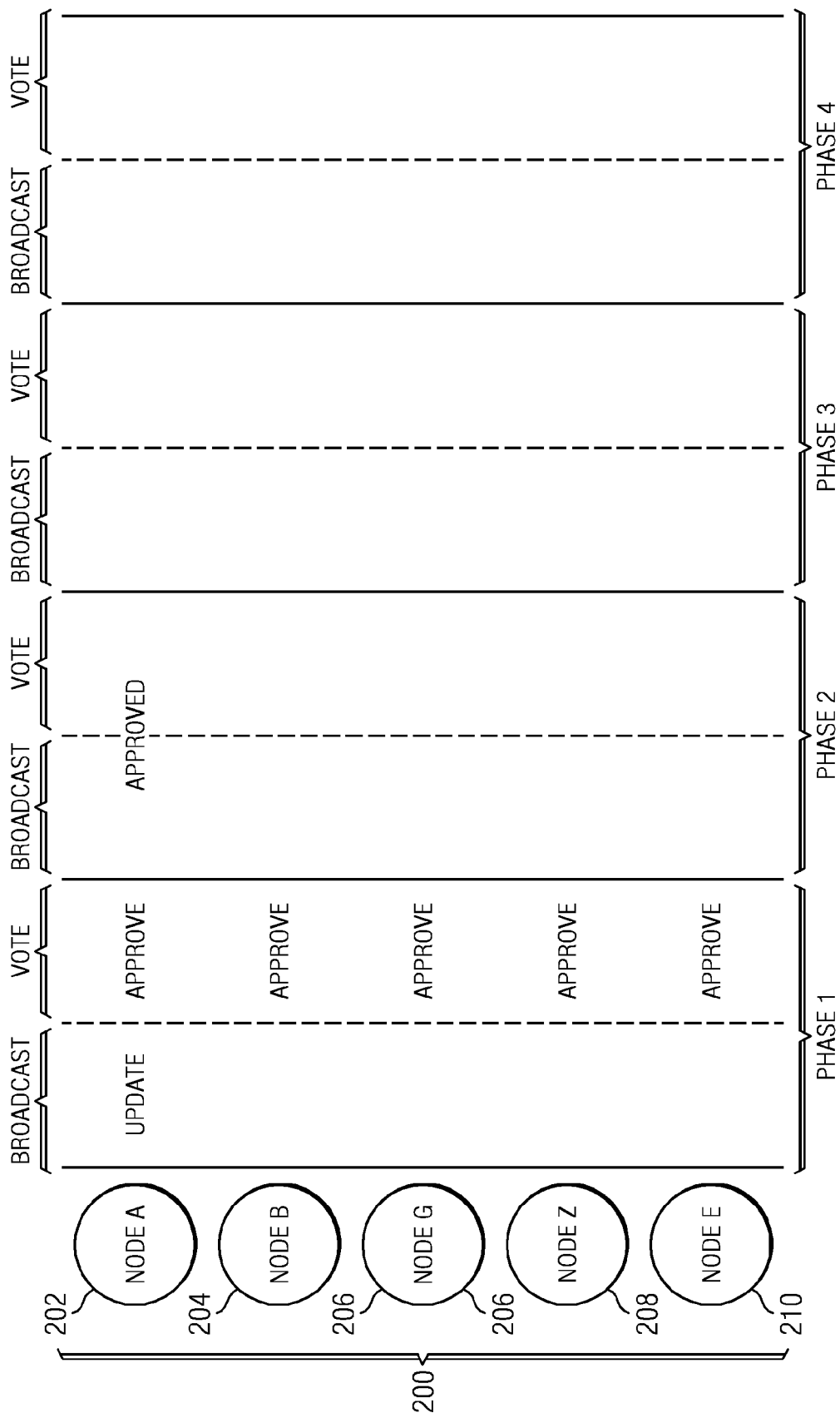
FIG. 4 is an example of no error occurring.

FIG. 4 is an example of the error detection protocol 300 (see FIG. 3) applied in a situation where there is no error after executing a modification request by a node of the cluster 200.

In this example, node_alpha 202 issues a data resource modification request to the group services client 212 (see FIG. 2), which broadcasts the modification request to the cluster nodes node_beta 204, node_gamma 206, node_zeta 208, node_epsilon 210, and node_delta 214. Each of the nodes of the cluster 200 apply the modification request to the local copy of the resource of that respective node. The requesting node, which in this example is node_alpha 202, sends its result of the modification request to the non-requesting nodes beta 204, gamma 206, zeta 208, epsilon 210, and delta 214.

The non-requesting nodes compare their result with the broadcast result and vote, as shown in phase 1. If there are no CONTINUE votes, the phase counter is incremented by one, and the group services client 212 (see FIG. 2) broadcasts the designation APPROVED in phase 2 to the nodes of the cluster 200, and the phase counter is again incremented, indicating that the EDP 300 completed in less than or equal to two phases. The EDP 300 then concludes (see FIG. 3).

FIG. 5 is an example of error detection protocol 300 (see FIG. 3) applied in a situation where there is an error among the nodes of the cluster 200.

In this example, node_alpha 202 issues a data resource modification request to the group services client 212 (see FIG. 2), which broadcasts the modification request to the cluster nodes node_beta 204, node_gamma 206, node_zeta 208, node_epsilon 210, and node_delta 214. Each of the nodes of the cluster 200 apply the modification request to the local copy of the resource of that respective node. The requesting node, which in this example is node_alpha 202, sends its result of the modification request to the non-requesting nodes beta 204, gamma 206, zeta 208, epsilon 210, and delta 214.

The non-requesting nodes compare their results with the broadcast result of the requesting node, and vote, as shown in phase 1. If there are no CONTINUE votes, the phase counter is incremented by one, and the group services client 212 (see FIG. 2) broadcasts the designation APPROVED in phase 2 to the nodes of the cluster 200, and the phase counter is again incremented, indicating that the EDP 300 completed in less than or equal to two phases. The EDP 300 then concludes (see FIG. 3).

In the example of FIG. 5, however, an error has occurred with respect to node_gamma 206. The comparison conducted in step 312 of the EDP 300 (see FIG. 3) continues with each of the nodes indicating the result of the modification request with a vote, as shown in phase 1.

The term "error" as used herein, is understood to be the condition where the result of a modification or a computation request is either (1) dissimilar from the result of the requesting node if the dissimilarity occurs in a non-requesting node, or (2) the requesting node has an error code other than a SUCCESS code. For example, errors can be a syntax error, or an out-of-resources error. Nevertheless, if every node of the cluster 200 has the same result, such as a syntax error, then no error is considered to have occurred that would require further error handling in the form of isolating the error of the present invention. Other forms of error handling and detection, which are known to those skilled in the art, would be used.

In FIG. 5, node_alpha 202 vote APPROVE with an error code of value SUCCESS, node_beta 204, node_epsilon 208, and node_zeta 210 vote APPROVE but do not send out their error code of SUCCESS. Node_gamma 206 votes CONTINUE, indicating a dissimilar result with the requesting node_alpha 202. The phase counter is incremented by one to indicate that phase 1 of the EDP 300 has been completed.

In phase 2, the group services client has received the votes of all the nodes, and the error code of requesting node node_alpha 202 is broadcast, and in step 328 (see FIG. 3), is compared with the result codes at each of the nodes. Each of the nodes then vote again.

Each of the nodes that previously voted APPROVE, again vote APPROVE because the comparison is made with respect to the result of the requesting node. The requesting node in this example is node_alpha 202. Node_gamma 206 votes CONTINUE and sends with the CONTINUE vote its error code and error information, as shown in step 330 (see FIG. 3). The phase number is incremented, and the EDP 300 passes to phase 3.

In phase 3, the group services client 212 broadcasts the error message to the nodes of cluster 200. Node_gamma 206 votes APPROVE with no message because it has already broadcast its error result to all other nodes. All other nodes vote APPROVE because they agree with the SUCCESS result from the requesting node node_alpha 202. The phase number is again incremented.

In phase 4, the protocol has been approved by all nodes and the group services client broadcast no new message to all the nodes. All nodes deduce that node_gamma 206 was the only node that has a dissimilar result with other nodes.

Further error handling can be used accordingly in view of the specific error that occurred. For simplicity, an example of handling the error is to simply revoke the node membership in the cluster 200, until the error can be corrected. Accordingly, node_gamma 206 is removed from the cluster 200.

FIG. 6 is an example of the error detection protocol 300 (see FIG. 3) applied in a situation where a single error is detected for the requesting node.

In this example, node_alpha 202 issues a data resource modification request to the group services client 212 (FIG. 2), which broadcasts the modification request to the cluster nodes node_beta 204, node_gamma 206, node_zeta 208, node_epsilon 210, and node_delta 214. Each of the nodes of the cluster 200 apply the modification request to the local copy of the resource of that respective node. The requesting node, which in this example is node_alpha 202, sends its result of the modification request to the non-requesting nodes_beta 204, gamma 206, zeta 208, epsilon 210, and delta 214.

The non-requesting nodes compare their results with the broadcast result of the requesting node, and vote, as shown in phase 1. If there are no CONTINUE votes, the phase counter is incremented by one, and the group services client 212 (see FIG. 2) broadcasts the designation APPROVED in phase 2 to the nodes of the cluster 200, and the phase counter is again incremented, indicating that the EDP 300 completed in less than or equal to two phases. The EDP 300 then concludes (see FIG. 3).

In the example of FIG. 6, however, an error has occurred with respect to requesting node_alpha 202. In the example provided, the requesting node, node_alpha 202, has an error code other than a SUCCESS value. The non-requesting nodes have an error code with a SUCCESS value. Accordingly, the EDP 300 (see FIG. 3) serves to detect the node with a dissimilar result.

Accordingly, the comparison conducted in step 312 of the EDP 300 (see FIG. 3) continues with each of the nodes indicating the result of the modification request with a vote, as shown in phase 1.

In phase 1, the request node node_alpha 202 vote CONTINUE with its error code. All other nodes have an error code of SUCCESS and hence vote APPROVE with no message. Those non-requesting nodes should not send any message because only the requesting node is allowed to broadcast its error code in phase 2.

In phase 2, the group services client has received the ERROR message from the requesting node node_alpha 202 votes APPROVE for its own error result. All other nodes have dissimilar results with the requesting node and hence must broadcast their results. All other nodes vote CONTINUE with its SUCCESS return code. The phase number is then incremented to phase 3.

In phase 3, the group services client received the SUCCESS message from node_gamma 202. Node_gamma 202 votes APPROVE from this point on. All other nodes again vote CONTINUE with their SUCCESS result. This process repeats until all remaining nodes have broadcast their result. The protocol will be approved at the 6th phase for a cluster of 5 nodes given that no node fails during the processing of this protocol.

Although the present invention and its advantages have been described in detail, it should be understood that various changes, substitutions and alterations can be made herein without departing from the spirit and scope of the invention as defined by the appended claims.

What is claimed is:

1. A method for maintaining a consistent set of replicas of a database within a computer cluster, comprising the steps of:
   each node in the computer cluster receiving a database update request;
   each node in the computer cluster voting based on a functional outcome of the database update request; and
   detecting an out-of-sync condition as a result of a different functional outcome.

2. The method as recited in claim 1, wherein the out-of-sync condition is an error.

3. The method as recited in claim 1, further comprising the step of:
   refreshing the database in response to the detecting step.

4. The method as recited in claim 1, further comprising the step of:
   resetting cluster membership in response to the detecting step.

5. The method as recited in claim 1, further comprising the step of:
   blocking further participation by the node having the out-of-sync condition in response to the detecting step.

6. The method as recited in claim 1, further comprising the step of:
   declaring an end-of-transaction state on update voting completion when the database update is being done in a transactional manner.

7. The method as recited in claim 6, further comprising the step of:
   backing out an update when update voting does not meet a criteria established for success.

8. The method as recited in claim 7, wherein the criteria established for success is that no more than one node has inconsistent results.

9. A method for maintaining a consistent set of replicas of a database within a computer cluster, comprising the steps of:
   broadcasting an update to a database shared among a plurality of nodes in the computer cluster;
   applying the update to a local copy of the database at each of the plurality of nodes in the computer cluster;
   node requesting update broadcasts results of update to all of the other nodes in the computer cluster;
   comparing, by all of the other nodes in the computer cluster, the update results to results of application of the update to the local copy of the database; and
   voting, by all of the other nodes in the computer cluster, to approve update if a match results from the comparison.

10. The method as recited in claim 9, further comprising the step of:

voting, by any one of the other nodes in the computer cluster, to continue with update process if a match does not result from the comparison.

11. The method as recited in claim 9, further comprising the step of:
broadcasting an approval of the update to the database if all of the other nodes vote to approve the update.

12. The method as recited in claim 10, further comprising the step of:
if more than one of the plurality of nodes votes to continue, performing a recovery process.

13. The method as recited in claim 12, wherein the recovery process further comprises the step of:
if more than a specified number of the nodes voted to continue, backing out the update to the database.

14. The method as recited in claim 12, wherein the recovery process further comprises the step of:
if less than a specified number of the nodes voted to continue, performing the recovery process on the specified number of the nodes.

15. A computer cluster operable for maintaining a consistent set of replicas of a database within the computer cluster, comprising:
a group services client operable for broadcasting an update to a database shared among a plurality of nodes in the computer cluster;
the plurality of nodes coupled to the computer cluster operable for applying the update to a local copy of the database at each of the plurality of nodes in the computer cluster;
circuitry for broadcasting results of the update to all of the other nodes in the computer cluster;
circuitry for comparing, by all of the other nodes in the computer cluster, the update results to results of application of the update to the local copy of the database; and
circuitry for voting, by all of the other nodes in the computer cluster, to approve update if a match results from the comparison.

16. The computer cluster as recited in claim 15, further comprising:
circuitry for voting, by any one of the other nodes in the computer cluster, to continue with update process if a match does not result from the comparison.

17. The computer cluster as recited in claim 15, further comprising:
circuitry for broadcasting an approval of the update to the database if all of the other nodes vote to approve the update.

18. The computer cluster as recited in claim 16, further comprising:
if more than one of the plurality of nodes votes to continue, circuitry for performing a recovery process.

19. The computer cluster as recited in claim 18, wherein the recovery process further comprises:
if more than a specified number of the nodes voted to continue, circuitry for backing out the update to the database.

20. The computer cluster as recited in claim 18, wherein the recovery process further comprises:
if less than a specified number of the nodes voted to continue, circuitry for performing the recovery process on the specified number of the nodes.

21. A computer program product adaptable for storage on a computer readable medium, the computer program product operable for maintaining a consistent set of replicas of a database within a computer cluster, comprising the program steps of:
broadcasting an update to a database shared among a plurality of nodes in the computer cluster;
applying the update to a local copy of the database at each of the plurality of nodes in the computer cluster;
node requesting update broadcasts results of update to all of the other nodes in the computer cluster;
comparing, by all of the other nodes in the computer cluster, the update results to results of application of the update to the local copy of the database;
voting, by all of the other nodes in the computer cluster, to approve update if a match results from the comparison; and
voting, by any one of the other nodes in the computer cluster, to continue with update process if a match does not result from the comparison.

22. The computer program product as recited in claim 21, further comprising the program step of:
broadcasting an approval of the update to the database if all of the other nodes vote to approve the update.

23. The computer program product as recited in claim 22, further comprising the program step of:
if more than one of the plurality of nodes votes to continue, performing a recovery process.

24. The computer program product as recited in claim 23, wherein the recovery process further comprises the program step of:
if more than a specified number of the nodes voted to continue, backing out the update to the database.

25. The computer program product as recited in claim 24, wherein the recovery process further comprises the program step of:
if less than a specified number of the nodes voted to continue, performing the recovery process on the specified number of the nodes.

* * * * *